United States Patent
Law

(10) Patent No.: US 7,621,491 B2
(45) Date of Patent: Nov. 24, 2009

(54) PORTABLE SUPPORTING APPARATUS

(76) Inventor: Hung Hi Law, Rm 505, 5/F, Goodluck Ind. Ctr., 808 Lai Chi Kok Road, Kowloon, Hong Kong (HK)

( * ) Notice: Subject to any disclaimer, the term of this patent is extended or adjusted under 35 U.S.C. 154(b) by 0 days.

(21) Appl. No.: 11/877,236

(22) Filed: Oct. 23, 2007

(65) Prior Publication Data

US 2009/0026331 A1   Jan. 29, 2009

Related U.S. Application Data

(63) Continuation-in-part of application No. 11/828,355, filed on Jul. 26, 2007, now Pat. No. 7,490,797.

(51) Int. Cl.
*F16M 11/00* (2006.01)
(52) U.S. Cl. ..................... 248/163.2; 248/168
(58) Field of Classification Search ............. 248/163.1, 248/163.2, 167, 168, 187.1, 316.5, 316.4, 248/229.13, 170, 278.1, 288.31, 288.51; 396/421, 428
See application file for complete search history.

(56) References Cited

U.S. PATENT DOCUMENTS

| | | | | |
|---|---|---|---|---|
| 4,648,698 A | * | 3/1987 | Iwasaki | .................... 248/163.1 |
| 5,043,750 A | * | 8/1991 | Yamaguchi | .................. 396/428 |
| 5,647,565 A | * | 7/1997 | Wei | ............................. 248/168 |
| 6,209,830 B1 | * | 4/2001 | Brotz | ....................... 248/187.1 |
| 6,487,807 B1 | * | 12/2002 | Kopman et al. | ................. 42/94 |
| 6,540,184 B2 | * | 4/2003 | Thaxton | ..................... 248/160 |
| 6,679,463 B1 | * | 1/2004 | Chen | ........................... 248/126 |
| 6,824,319 B1 | * | 11/2004 | Speggiorin | ................... 396/428 |
| 2007/0090235 A1 | * | 4/2007 | Ziemkowski et al. | ..... 248/163.1 |
| 2008/0267613 A1 | * | 10/2008 | Darrow | ....................... 396/428 |
| 2008/0283697 A1 | * | 11/2008 | Darrow | .................... 248/163.1 |

FOREIGN PATENT DOCUMENTS

GB    2221978    * 2/1990    .............. 248/163.1

* cited by examiner

*Primary Examiner*—Ramon O Ramirez

(57) ABSTRACT

A portable supporting apparatus for a portable multimedia device includes a support housing and a mounting arrangement. The support housing includes a multimedia connector for detachably connecting with the portable multimedia device. The mounting arrangement is provided underneath the support housing, and includes a plurality of supporting legs, each having a predetermined shape, pivotally and downwardly extended from the support housing, wherein supporting legs are adapted to move between an idle position, and a mounting position where each of the supporting legs is pivotally moved to form a predetermined angle of inclination with respect to the support housing so as to bias against an external object for frictionally retaining a position of the support housing with respect to the external object, such that the portable multimedia device is capable of being securely supported by the external object through the portable supporting apparatus.

17 Claims, 17 Drawing Sheets

PORTABLE SUPPORTING APPARATUS

CROSS REFERENCE OF RELATED APPLICATION

This is a Continuation-In-Part of a non-provisional application having an application number of Ser. No. 11/828,355 filed Jul. 26, 2007 now U.S. Pat. No. 7,490,797.

BACKGROUND OF THE PRESENT INVENTION

1. Field of Invention

The present invention relates to a multimedia device accessory, and more particularly to a portable supporting apparatus which is capable of mounting a portable multimedia device, such as a digital camera or a display screen of multimedia playing system, to an external object so as to allow convenient and secure enjoyment of the multimedia materials delivered by the multimedia device in a non-conventional environment.

2. Description of Related Arts

Conventional multimedia devices include digital cameras, digital video recorders, portable multimedia players and the likes. In recent years, such multimedia devices have widely been utilized in a wide variety of circumstances, such as in an environment other than a conventional domestic indoor environment. For example, people may bring their portable multimedia players on board while they are traveling. Moreover, people may also bring their digital cameras to an outdoor environment so that they may take pictures in a convenient manner.

In order to utilize the multimedia devices in their fullest extent, many accessories have been developed to allow particular types of multimedia devices to be used when particular circumstances occur. For example, when a user wishes to have extended light exposure on the part of his or her digital camera, he or she may need a tripod for securely and stably supporting his or her digital camera. Besides, when a user wishes to watch a movie when he or she is traveling on a long-haul journey by bus, the user may wish to mount the display screen of a portable multimedia player playing system into his or her seat (e.g. the handle bar of his or her seat).

Now a major problem for these portable multimedia devices is that each particular multimedia device requires a designated or a particular type of accessory. For instances, a conventionally tripod is usually designed to only support a digital camera in an outdoor environment. Other multimedia devices require different accessories. Since many people may utilize a number of multimedia devices in a single activity (e.g. a user may wish to use digital camera as well as a multimedia player (such as ipod) during traveling), it is very inconvenient for them to carry the corresponding number of accessories, especially when the nature of the activity does not recommend bringing many personal belongings with the participants.

Furthermore, even a digital camera utilized in a different circumstance requires a different type of accessory. For example, when a user wishes to have his or her digital camera supported in a confined area such as in an aircraft, that user cannot rely on a conventional tripod because it would be too bulky for him/her to carry it on board. Again, the fact that the user may carry with him a number of accessories for use in different yet typical circumstances imparts undue convenience to him and the user may simple retreat from using some multimedia devices. This result is highly undesirable.

As a matter of fact, there exits a conventional tripod comprising a support housing for detachably attaching with a camera, and a plurality of bendable supporting legs spacedly extended underneath the support housing for winding onto an external objects so as to stably mount the camera onto that external object. Each of the bendable supporting legs comprises a plurality of rounded shaped supporting elements movably attached onto each two adjacent supporting elements in such a manner that each two supporting elements are allowed to pivotally move to a certain extent with respective to the adjacent supporting elements. Accordingly, each of the supporting legs is allowed to bend into a wide variety of shapes for winding onto an external object (such as a main stem of a tree). A disadvantage of this kind of conventional tripod is that the supporting legs can only wind onto an external object, thereby substantially limiting the circumstances in which they can be utilized for supporting a portable multimedia device, such as a digital camera.

SUMMARY OF THE PRESENT INVENTION

A main object of the present invention is to provide a portable supporting apparatus which is capable of mounting a portable multimedia device, such as a digital camera or a portable multimedia system, to an external object so as to allow convenient and secure enjoyment of the multimedia materials delivered by the multimedia device in a non-conventional environment.

Another object of the present invention is to provide a portable supporting apparatus which is capable of stably and detachably mounting a wide variety of multimedia devices to an external object in a frictional manner. In other words, the present invention allows the user to carry with him only a minimum number of accessories for his or her multimedia devices.

Another object of the present invention is to provide a portable supporting apparatus comprising a plurality of supporting legs which is capable of mounting on a wide variety of external objects so as to maximize the circumstances in which the present invention can be utilized.

Another object of the present invention is to provide a portable supporting apparatus which is light in weight and simple in structure so that the present invention can be conveniently transported and carried and easily used by a user.

Another object of the present invention is to provide a portable supporting apparatus which does not involve complicated or expensive mechanical or electrical components. As a result, the manufacturing cost of the present invention can be minimized.

In order to accomplish the above objects, the present invention provides a portable supporting apparatus for a portable multimedia device, comprising:

a support housing which comprises a multimedia connector for detachably connecting with the portable multimedia device; and a mounting arrangement which is provided underneath the support housing, and comprises a plurality of supporting legs, each having a predetermined shape, pivotally and downwardly extended from the support housing, wherein the supporting legs are adapted to move between an idle position and a mounting position, wherein in the idle position, each of the supporting legs is vertically and downwardly extended from the support housing for being conveniently transported and stored, wherein in the mounting position, each of the supporting legs is pivotally moved to form a predetermined angle of inclination with respect to the support housing so as to bias against an external object for frictionally retaining a position of the support housing with respect to the external object, such that the portable multimedia device is capable of being securely supported by the external object through the portable supporting apparatus.

The above mentioned objectives, features, and advantages of the present invention will be more clearly described and shown in the following detailed description, drawings, and the claims.

DETAILED DESCRIPTION OF THE PREFERRED EMBODIMENT

Figure 1:
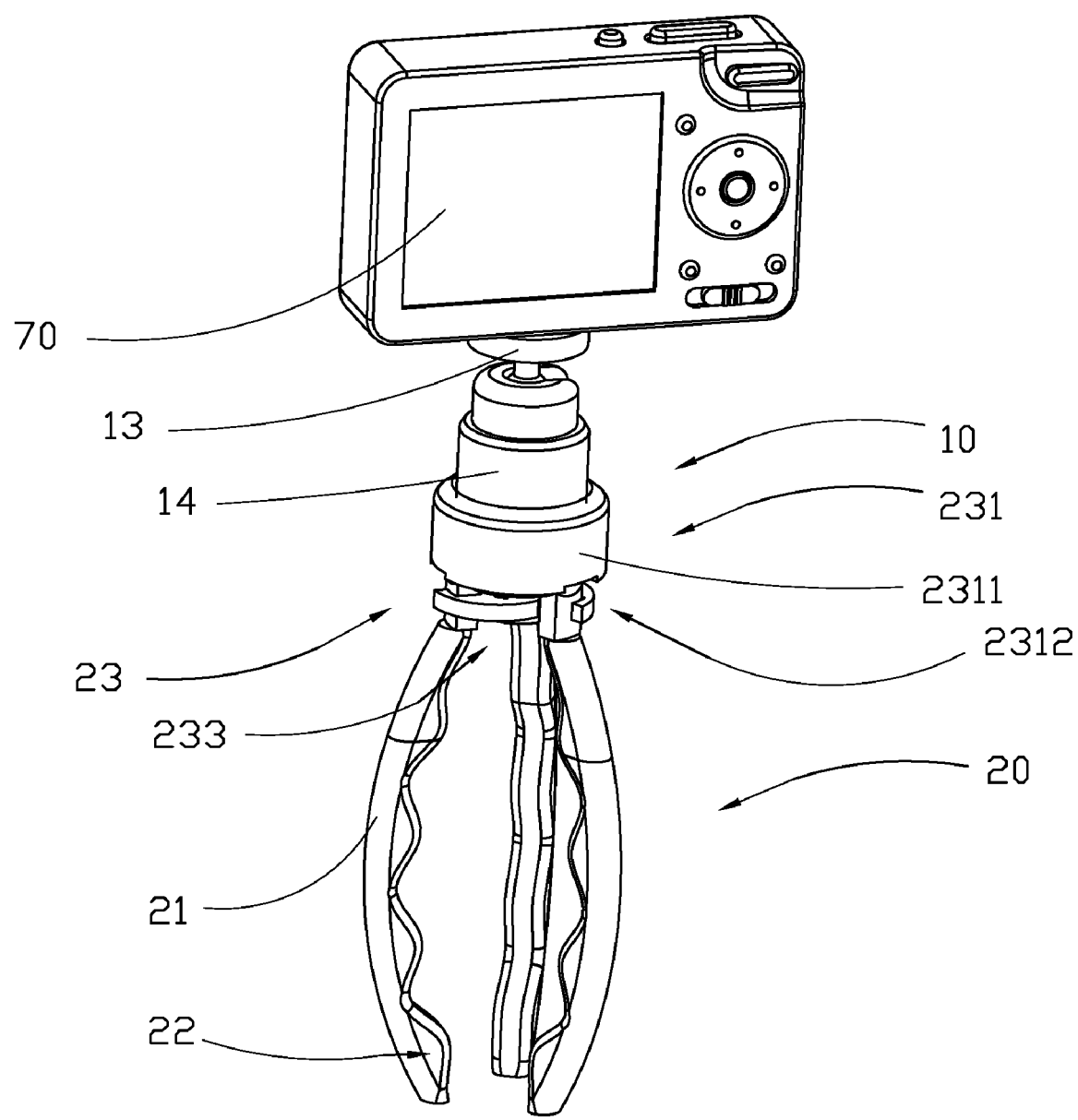
FIG. 1 is a perspective view of a portable supporting apparatus according a preferred embodiment of the present invention.

Referring to FIG. 1, FIG. 2, FIG. 3A, FIG. 3B, and FIG. 4 of the drawings, a portable supporting apparatus for a portable multimedia device 70 according to a preferred embodiment of the present invention is illustrated, in which the portable supporting apparatus comprises a support housing 10, and a mounting arrangement 20. The portable multimedia device 70 is a conventional multimedia device, such as a digital camera, a digital video recorder, a portable multimedia player (e.g. ipod, MP4 player etc.), and the likes.

The support housing 10 comprises a multimedia connector 11 for detachably connecting with the portable multimedia device 70.

The mounting arrangement 20 is provided underneath the support housing 10, and comprises a plurality of supporting legs 21, each having a predetermined shape, pivotally and downwardly extended from the support housing 10, wherein the supporting legs 21 are adapted to move between an idle position and a mounting position, wherein in the idle position, each of the supporting legs 21 is downwardly extended from the support housing 10 for being conveniently transported and stored, wherein in the mounting position, each of the supporting legs 21 is pivotally moved to form a predetermined angle of inclination with respect to the support housing 10 so as to bias against an external object 80 for frictionally retaining a position of the support housing 10 with respect to the external object 80, such that the portable multimedia device 70 is capable of being securely supported by the external object 80 through the portable supporting apparatus.

According to the preferred embodiment of the present invention, the support housing 10 further comprises a supporting platform 13 having a supporting surface 12 formed thereon for the portable multimedia device 70 resting thereon, wherein the multimedia connector 11 is provided on the supporting surface 12 for detachably connecting with the portable multimedia device 70 so as to detachably connect the support housing 10 with the portable multimedia device 70. The multimedia connector 11 can be a known connector utilized in a conventional tripod, such as a connecting screw having a threaded portion adapted for connecting with a corresponding threaded hole formed on the portable multimedia device 70.

The support housing 10 further comprises a connecting joint 14 pivotally connecting the supporting legs 21 of the mounting arrangement 20 with the supporting platform 13 in such a manner that each of the supporting legs 21 is adapted to pivotally move with respect to the supporting platform 13 for frictionally mounting to an external object 80. More specifically, the connecting joint 14 is securely mounted underneath the supporting platform 13 for pivotally connecting with a top end portion of each of the supporting legs 21 so that they are capable of moving between the idle position and the mounting position.

On the other hand, the mounting arrangement 20 further comprises a plurality of engaging teeth 22 formed along a main body portion of each of the supporting legs 21 for substantially enhancing a clamping performance thereof when they are pivotally moved to the mounting position. According to the preferred embodiment of the present invention, the engaging teeth 22 are formed on an inner side surface along the main body portion of each of the supporting legs 21 so that when they are pivotally moved to frictionally mount onto an external object 80, the engaging teeth 22 are adapted for biasing against an outer surface of the external object 80 so as to substantially grip on that external object 80 for mounting the support housing 10 (and thus the portable multimedia device) thereon.

Figure 3A:
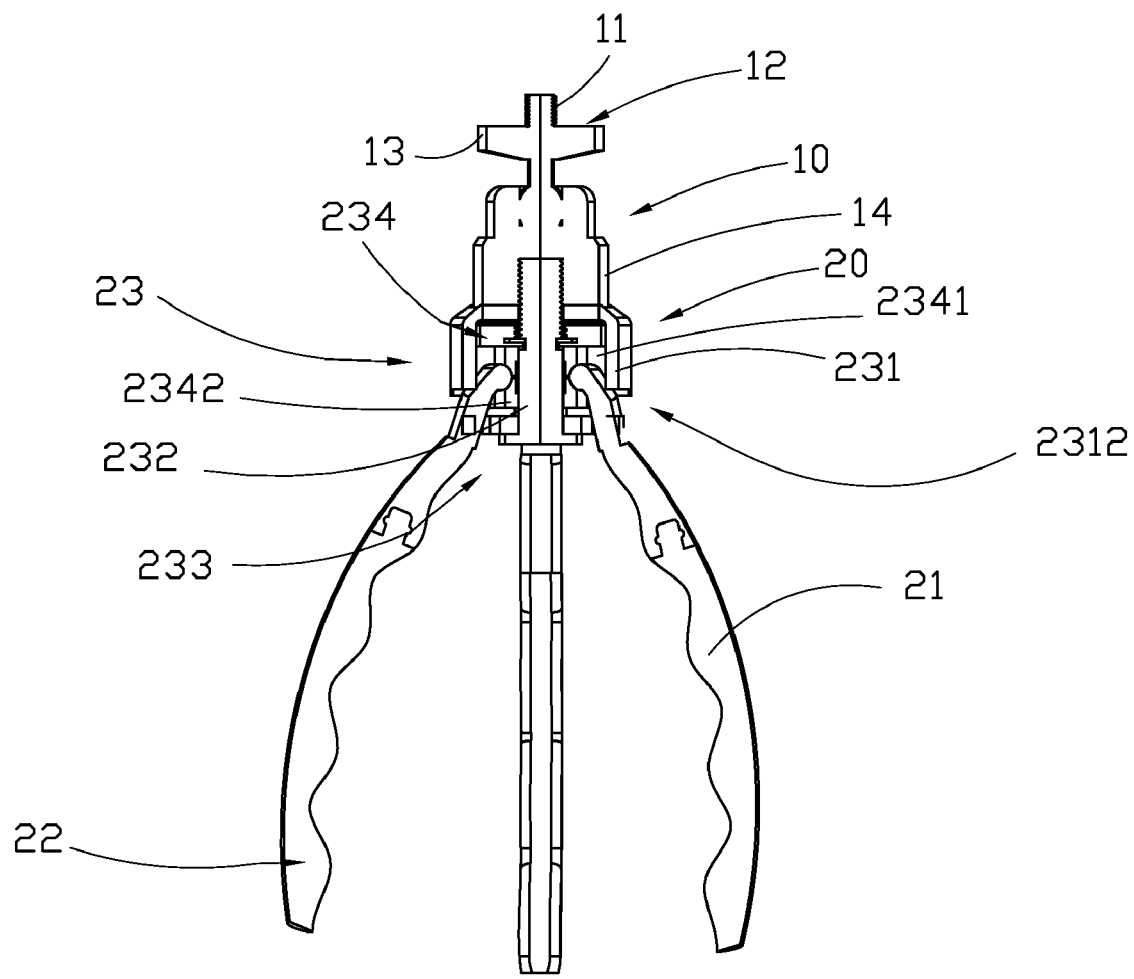
FIG. 3A and FIG. 3B are sectional side views of the portable supporting apparatus according to the preferred embodiment of the present invention.
Figure 3B:
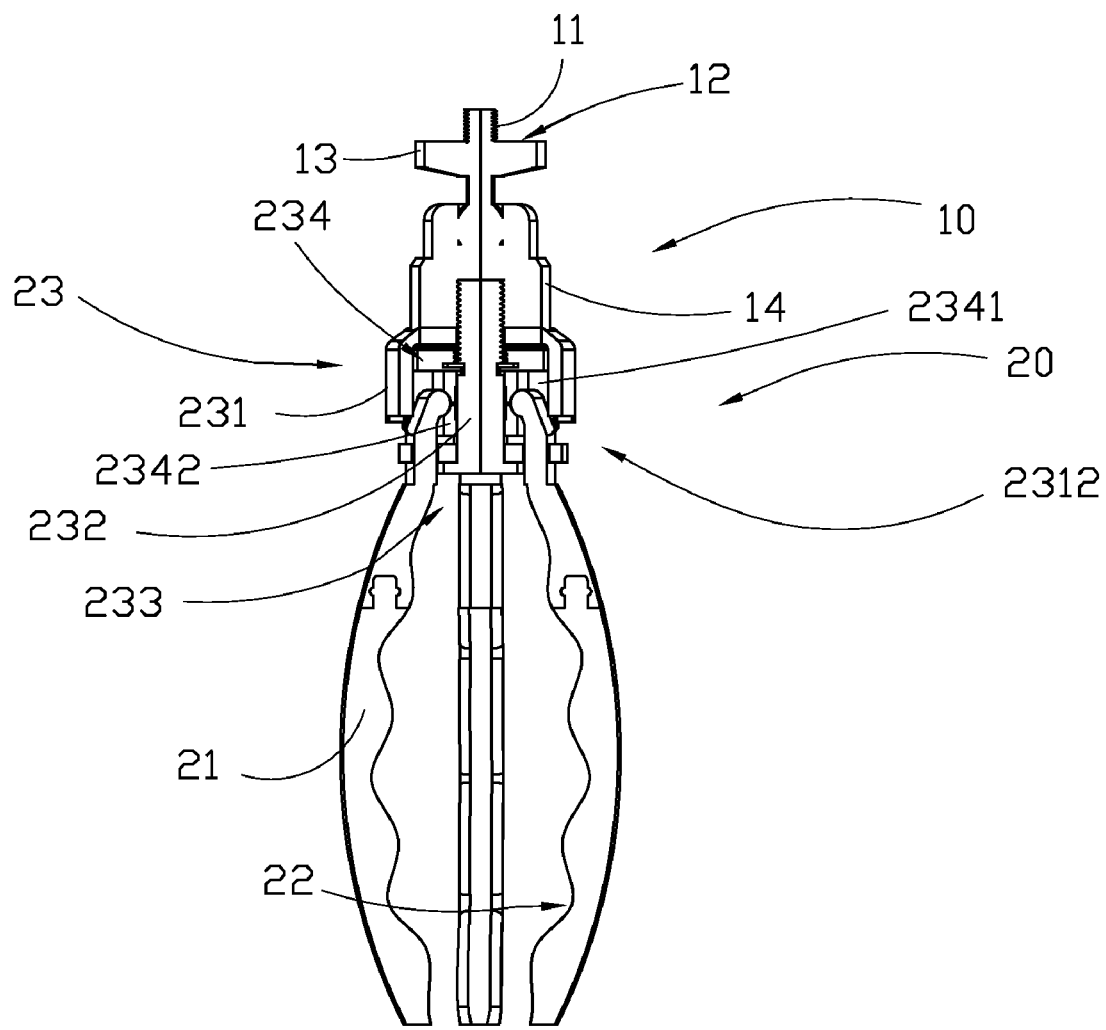
Figure 4:
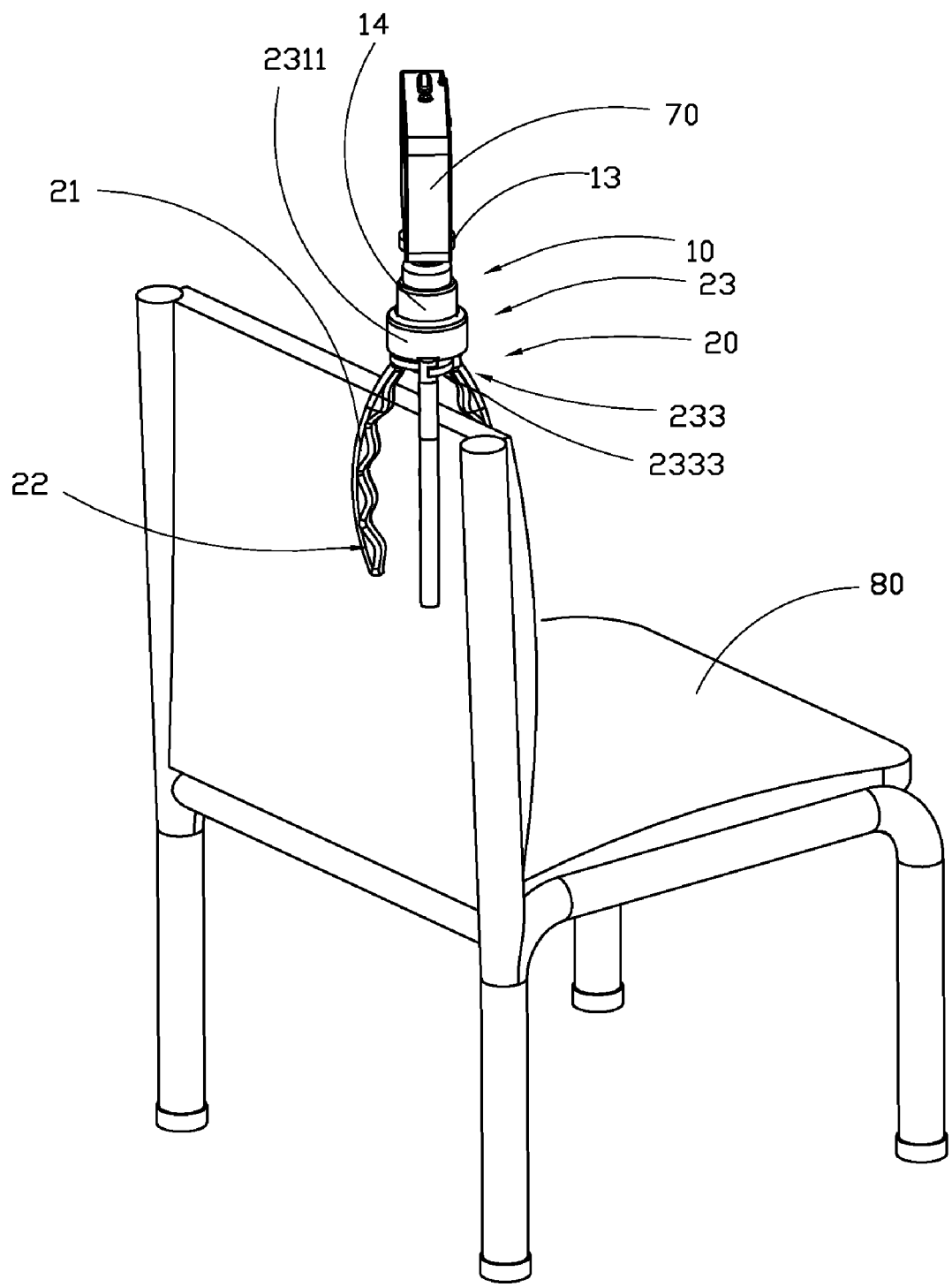
FIG. 4 is a schematic diagram of the portable supporting apparatus according to the preferred embodiment of the present invention.

Each of the supporting legs 21 preferably has a curved shape extending from the connecting joint 14 to a lower end portion of the respective supporting leg 21 for optimally clamping onto the external object 80. An explicit illustration on the working mechanism of the present invention is shown in FIG. 3A, FIG. 3B and FIG. 4 of the drawings. As shown in FIG. 3B and FIG. 4 of the drawings, when the supporting legs 21 are in the mounting position, each of the supporting legs 21 is pivotally (and perhaps inwardly) moved to clamp on the external object 80 (such as a chair) for securely and optimally mounting the support housing 10 onto that external object 80. Moreover, each of the supporting legs 21 is preferred to be pivotally connected to the connecting joint 14 at different geometrical planes so as to ensure that a pivotal movement of one of the supporting legs 21 will not interfere with the pivotal movement of any other supporting legs 21. In other words, when the supporting legs 21 are pivotally moved toward each other, each of the supporting legs 21 will not hit each other. Rather, each two supporting legs 21 are capable of pivotally and inwardly moving to pass each other along certain intersection axis and therefore exerting the maximum gripping force toward the external object 80.

As shown in FIG. 3A of the drawings, where a user wishes to mount the portable multimedia device between a physical structure as the external object 80 (such as when the user wishes to support the portable multimedia device in between two walls or within a confined space surrounded by walls), the supporting legs 21 are adapted to outwardly and pivotally extend from the support housing 10 to bias against the external object (such as the surround walls) so as to frictionally and securely support the support housing 10 in the space between the surrounding walls. In other words, the portable multimedia device, which is adapted to detachably mount onto the supporting platform 13 of the support housing 10, can be securely and stably supported by the surrounding walls as the external object 80 via the portable supporting apparatus of the present invention.

In order to further enhance the inventive features of the present invention, the mounting arrangement 20 further comprises a locking device 23 provided at the support housing 10 to operatively couple with the supporting legs 21 in such a manner that the locking device 23 is adapted to optimally lock up the supporting legs 21 in position. Thus, when the supporting legs 21 are locked and retained at a particular position, they are adapted to mount on the external object 80 in a stable and secure manner so as to stably and securely support the portable multimedia device 70 by the external object 80 via the portable supporting apparatus of the present invention.

The locking device 23 comprises a lock member 231 operatively provided underneath the supporting platform 13 of the support housing 10 for selectively locking the supporting legs 21 in position so as to allow the supporting legs 21 to frictionally mount the support housing 10 onto an external object 80. The locking device 23 further comprises a lock adjuster 232 operatively supported by the support housing 10 to mechanically communicate with the lock member 231 for selectively activating the lock member 231 to lock up the supporting legs 21 in position.

Figure 2:
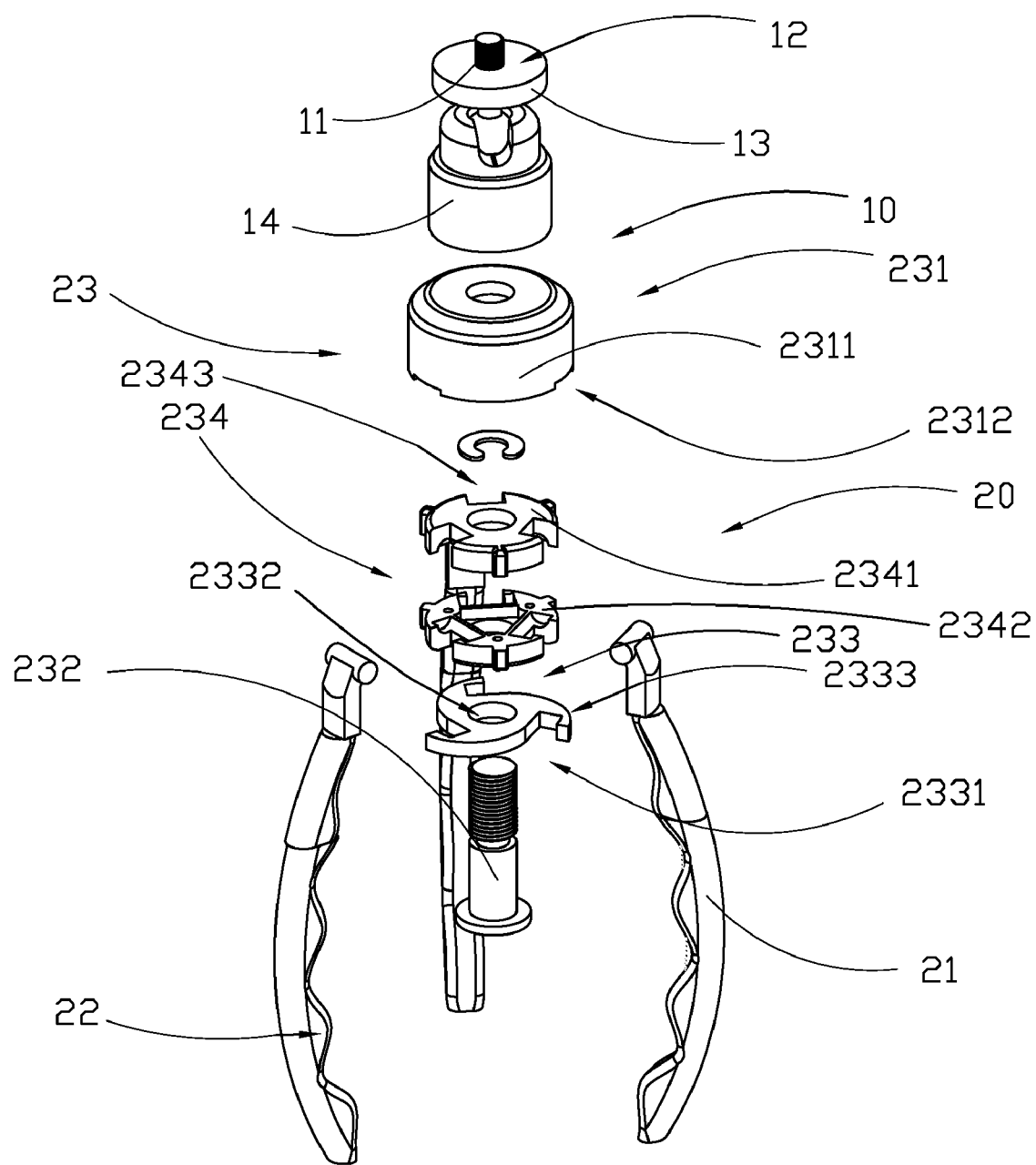
FIG. 2 is an exploded perspective view of the portable supporting apparatus according to the above preferred embodiment of the present invention.

More specifically, the lock member 231 comprises a locker cap 2311, having a plurality of locker slots 2312 spacedly formed on a sidewall of the locker cap 2311, movably underneath the supporting platform 13, wherein the supporting legs 21, which are pivotally connected with the support housing 10, are arranged to pass through the locker slots 2312 respectively in such a manner that an upward pivotal movement of each of the supporting legs 21 is dictated by a height of the corresponding locker slot 2312. In other words, an upward pivotal movement of each of the supporting legs 21 is restricted by a top edge of the corresponding locking slot 2312. Referring to FIG. 2 of the drawings, the lock adjuster 232 is preferably embodied as an adjusting screw rotatably engaged with the locker cap 2311 such that when the adjusting screw rotates, the locking cap 2311 is driven to move vertically along a longitudinal direction of the portable supporting apparatus for selectively locking up the supporting legs 21 in position.

The locking device 23 further comprises a securing device 233 rotatably mounted underneath the lock adjuster 232 at a position between the supporting legs 21 so as to rotatably and vertical displace along a longitudinal direction of the supporting legs 21. The securely device 233 is thus capable of ensuring that the supporting legs 21 are securely locked in position so as to enhance a mounting performance of the mounting arrangement 20. Referring to FIG. 1, FIG. 2, FIG. 3A, FIG. 3B and FIG. 4 of the drawings, the securing device 233 has a curved cross section and a plurality of securing slots 2331 spacedly formed thereon for normally receiving the supporting legs 21 within the securing slots 2331 respectively when the supporting legs 21 are in the idle position. According to the preferred embodiment of the present invention, each of the securing slots 2331 is elongated in shape and substantially aligns with a corresponding outer circumferential edge 2333 of the securing device 233 such that when the securing device 233 is driven to rotate, the supporting legs 21 are guided to disengage from the securing device 233 for freely and pivotally extending outwardly from the support housing 10.

It is important to point out that when the supporting legs 21 are pivotally extended and bias against the an external object 80, the securing device 233 is arranged to be rotated and moved at an optimal position in such a manner that the curved outer circumferential edge 2333 of the securing device 233 is adapted for biasing against the supporting legs 21 so as to maintain adequate frictional force on the part of the supporting legs 21 for allowing them to mount on the external object 80. In other words, the securing device 233 is capable of maintaining a sound frictional engagement between the supporting legs 21 and the external object 80. Thus, the securing device 233 further has a connecting hole 2332 arranged to operatively engage with the lock adjuster 232 in such a manner that when the securing device 233 is driven to rotate about the lock adjuster 232, the securing member 233 is guided to rotate and move vertically along a longitudinal direction of the lock adjuster 232.

The locking device 23 further comprises a locker housing 234 supported underneath the support housing 10 for supporting an upper end portion of each of the supporting legs 21 in a pivotally movable manner so as to allow the supporting legs 21 to be pivotally moved between the idle position and the mounting position. More specifically, the locker housing 234 comprises a first and a second housing body 2341, 2342 mounted underneath the support housing 10, wherein each of the first and the second housing body 2341, 2342 has a plurality of guiding slots 2343 spacedly formed thereon to align with the locker slots 2312 respectively underneath the locker cap 2311 so that the supporting legs 21 are capable of pivotally moving between the idle position and the mounting position via the guiding slots 2343. It is worth mentioning that when the locker cap 2311 is driven to lock up the supporting legs 21, the guiding slots 2343 is partially covered by the locker cap 2311 for not allowing the supporting legs 21 to pivotally move when they hit a top edge of the corresponding locker slot 2312.

From the above descriptions, it is important to point out that the portable supporting apparatus of the present invention can be utilized for conveniently mounting a portable multimedia device, such as a digital camera, on an external object 80, such as a chair. The present invention may be used in outdoor environment so that the user is able to set up his or her multimedia device in a wide variety of circumstances.

In order to further extend the circumstances in which the present invention may be utilized, the supporting legs 21 can be embodied as having different cross sectional shape, such as pentagonal, hexagonal, octagonal and the likes. Moreover, each of the supporting legs 21 may be made of flexible materials or actually memory materials so as to allow a more extended application of the present invention in rare circumstances. For example, when the portable supporting apparatus is to be utilized in a confined environment, slightly flexible supporting legs 21 may be helpful in mounting the support housing 10 within that confined environment.

Figure 5:
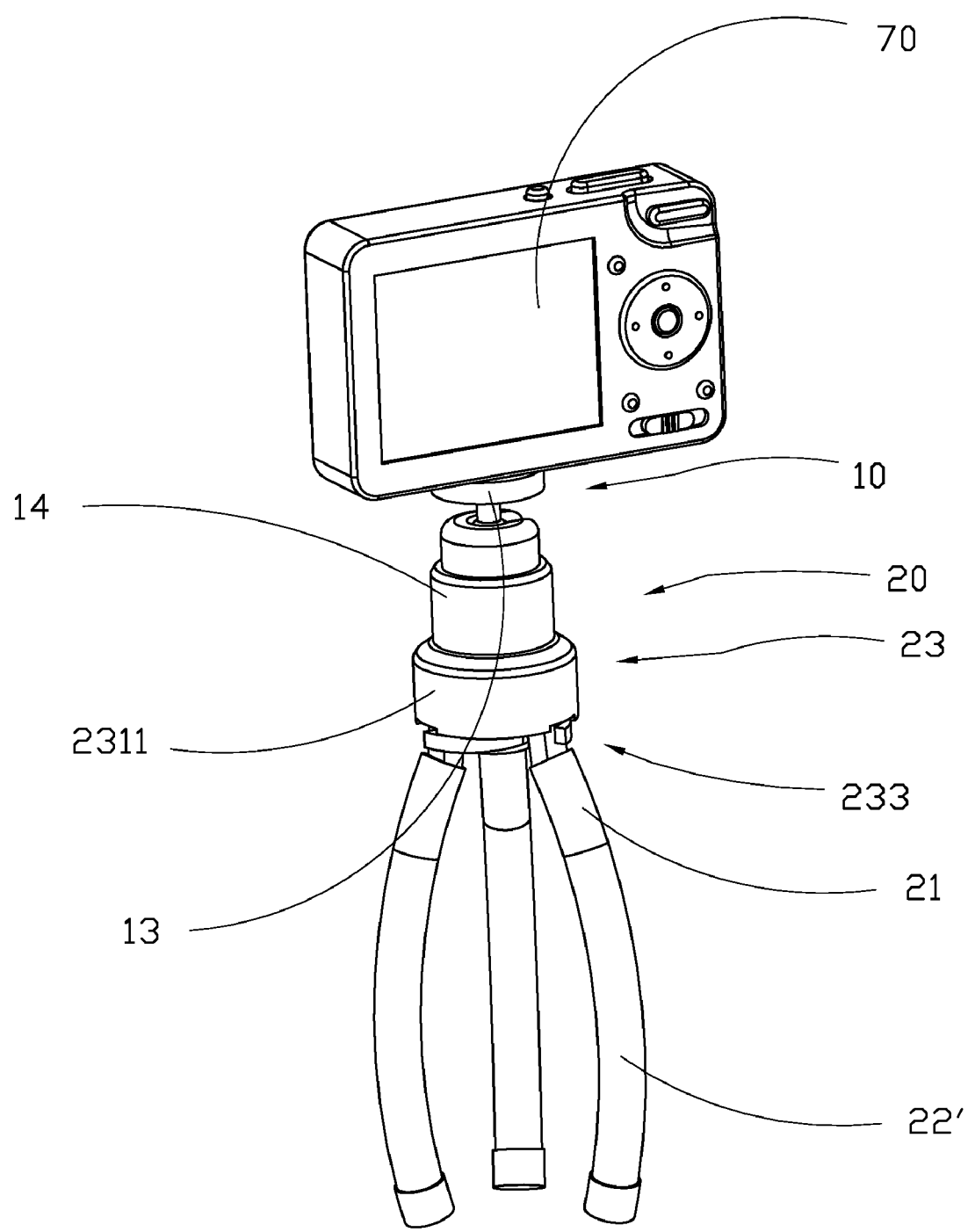
FIG. 5 is a first alternative mode of the portable supporting apparatus according to the preferred embodiment of the present invention.

Referring to FIG. 5 of the drawings, a first alternative mode of the portable supporting apparatus according to the preferred embodiment of the present invention is illustrated. The first alternative mode is similar to the preferred embodiment except that the mounting arrangement 20 does not have the plurality of engaging teeth 22, and further comprises a plurality of frictional member 22' fittedly embedded around each of the supporting legs 21 so as to provide adequate frictional force for mounting the supporting legs 21 onto the external object 80. According to the alternative mode, the frictional member 22' may be made of a wide range of materials, such as rubber materials which are capable of generating great frictional force between the frictional member 22' and the corresponding surface of the external object 80.

Referring to FIG. 6A to FIG. 6G of the drawings, a second alternative mode of the portable supporting apparatus according to the preferred embodiment of the present invention is illustrated. The second alternative mode is similar to the preferred embodiment except that the mounting arrangement 20". According to the second alternative mode, each of the supporting legs 21" comprises at least a first and a second leg segments 211", 212" movably connected with each other such that each of the first and the second leg segments 211", 212" is capable of freely rotating with respect to each other. In other words, since each of the supporting legs 21" has a predetermined curved cross section, when either leg segment 211" (212") rotates, the supporting legs 21" are adapted to extend optimally for frictionally biasing against the external object 80 so as to mount the support housing 10 thereonto. A lock 213" can be installed between the first and the second leg segments 211", 212" for restricting a lateral rotational movement between the first and the second leg segments 211", 212" when the supporting legs 21" are in the mounting position.

Figure 6A:
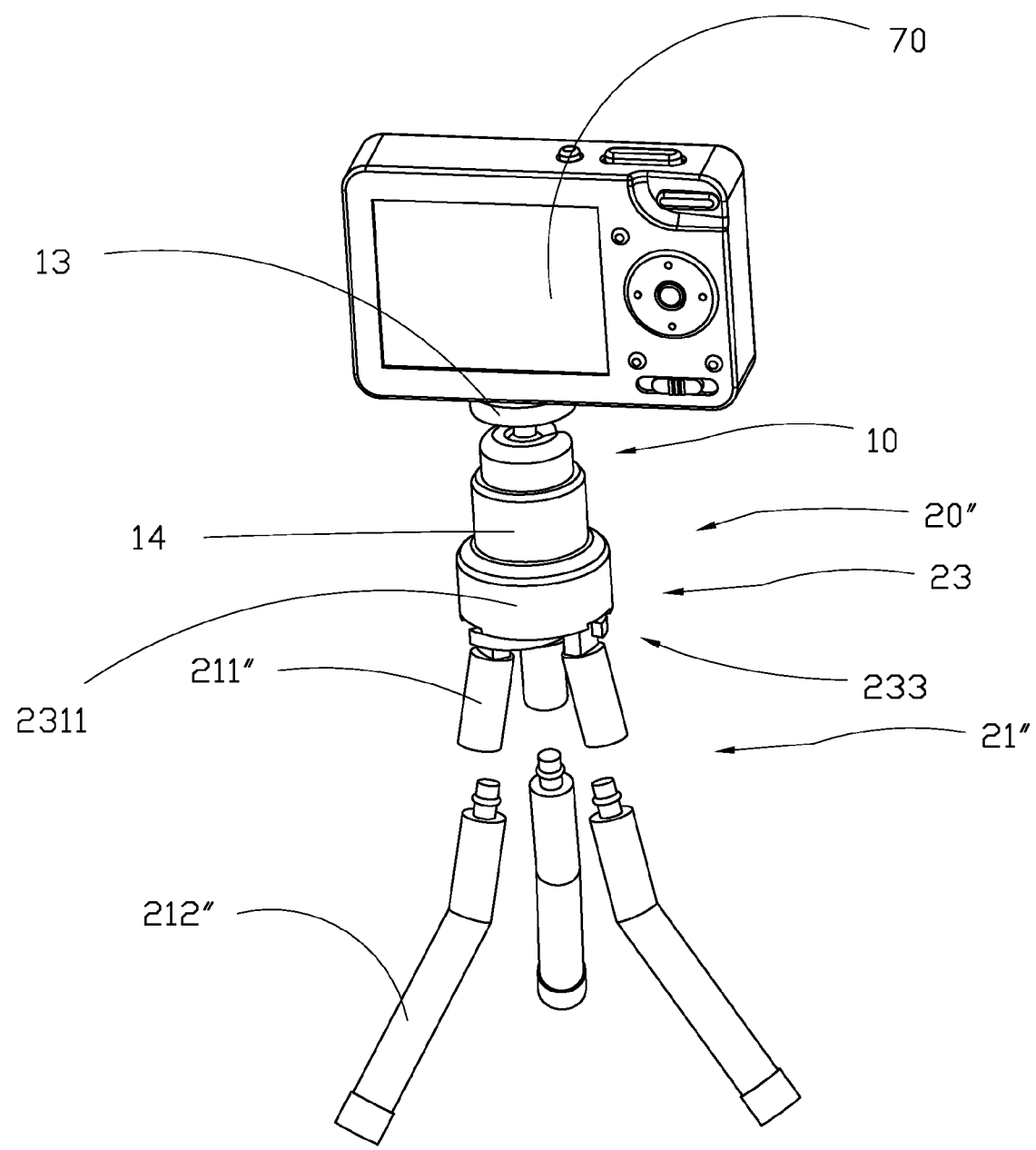
FIGS. 6A to 6G are schematic diagrams of a second alternative mode of the portable supporting apparatus according to the preferred embodiment of the present invention.
Figure 6B:
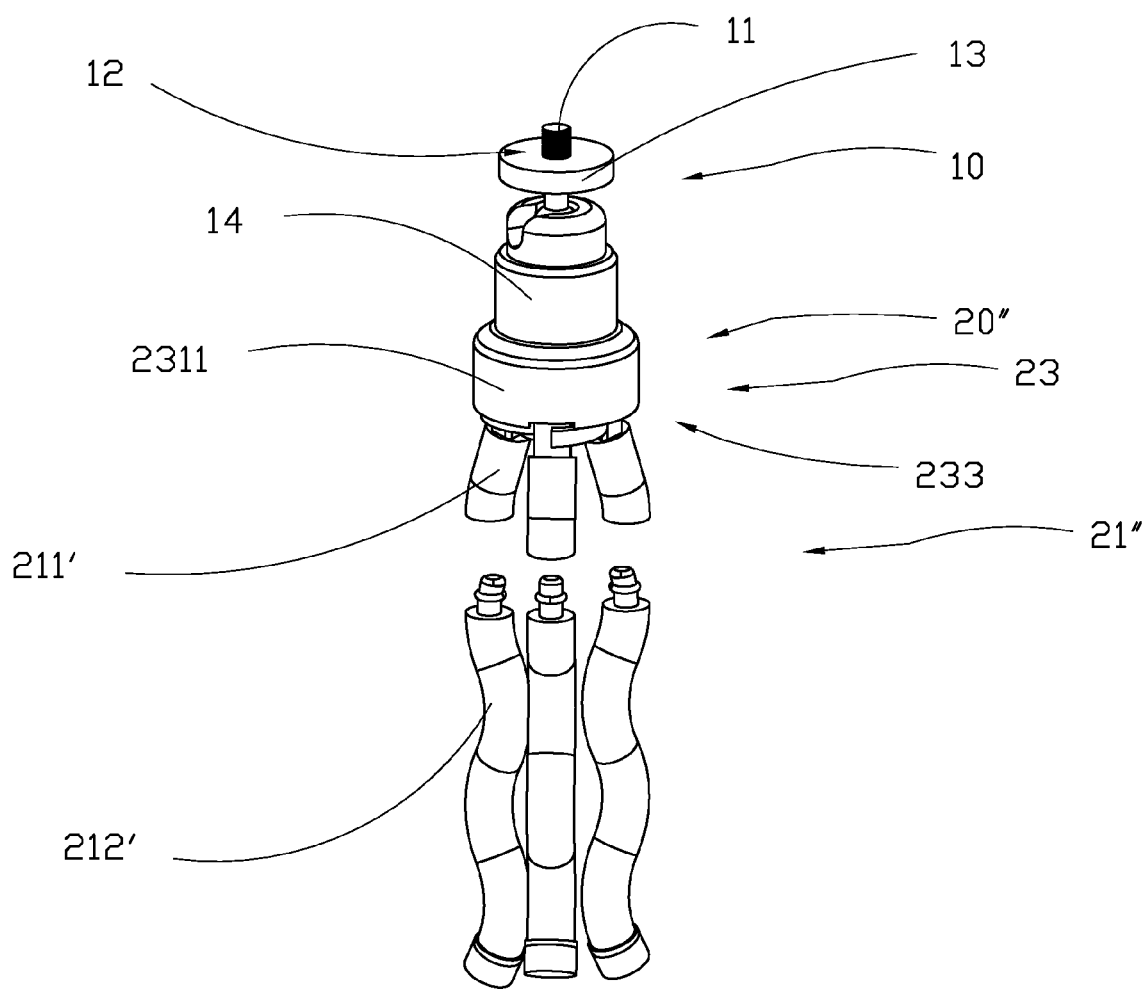
Figure 6C:
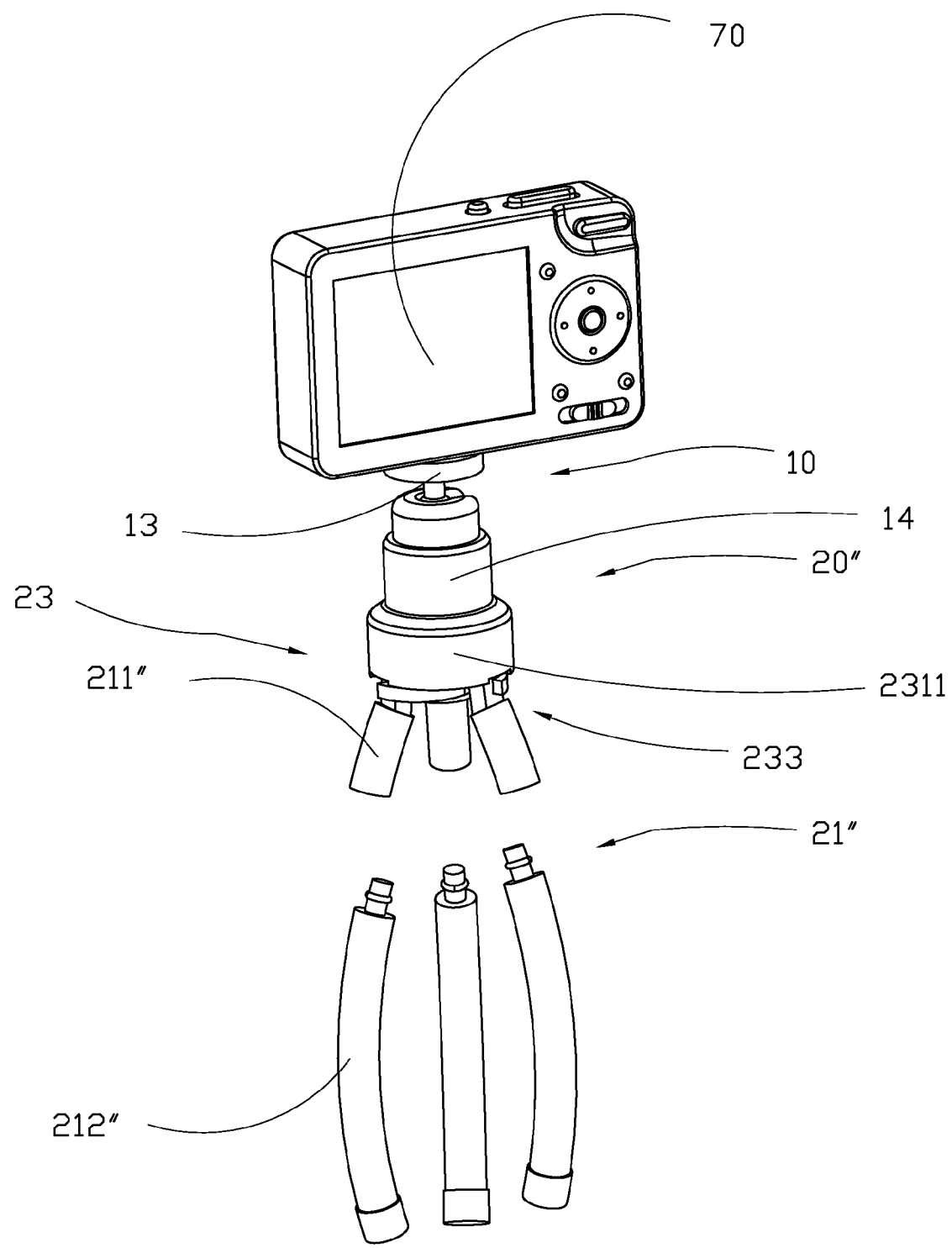
Figure 6D:
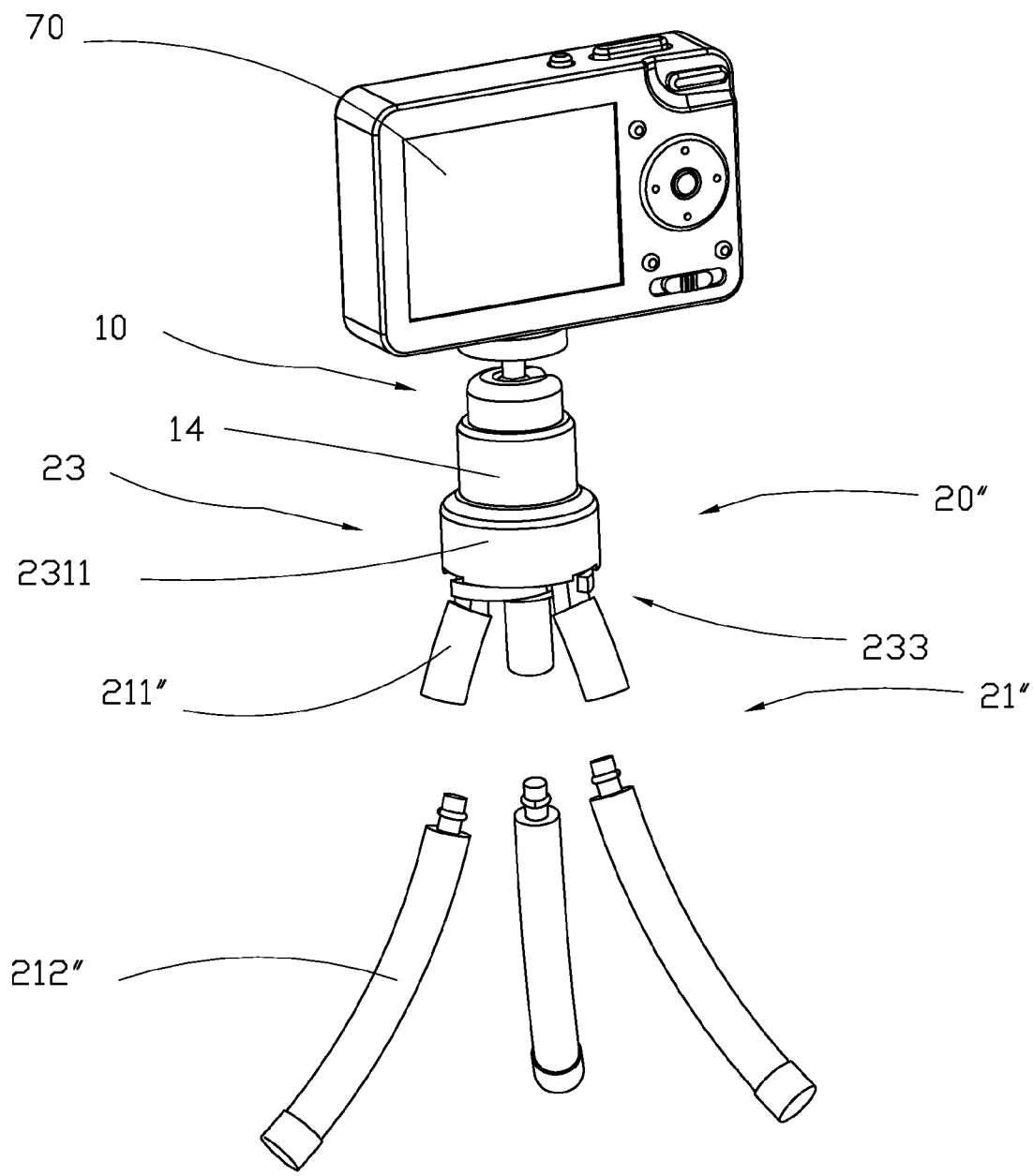
Figure 6E:
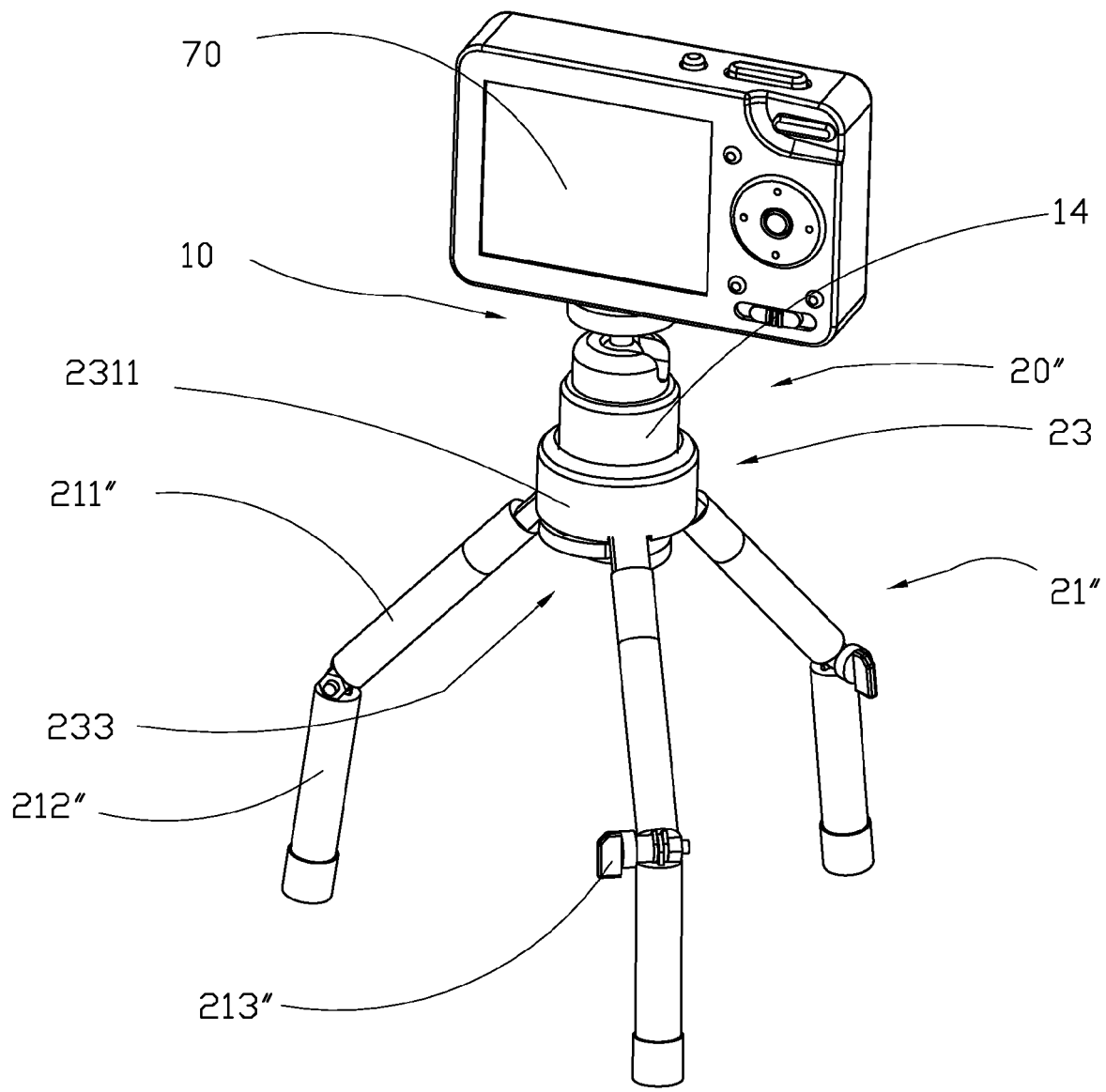
Figure 6F:
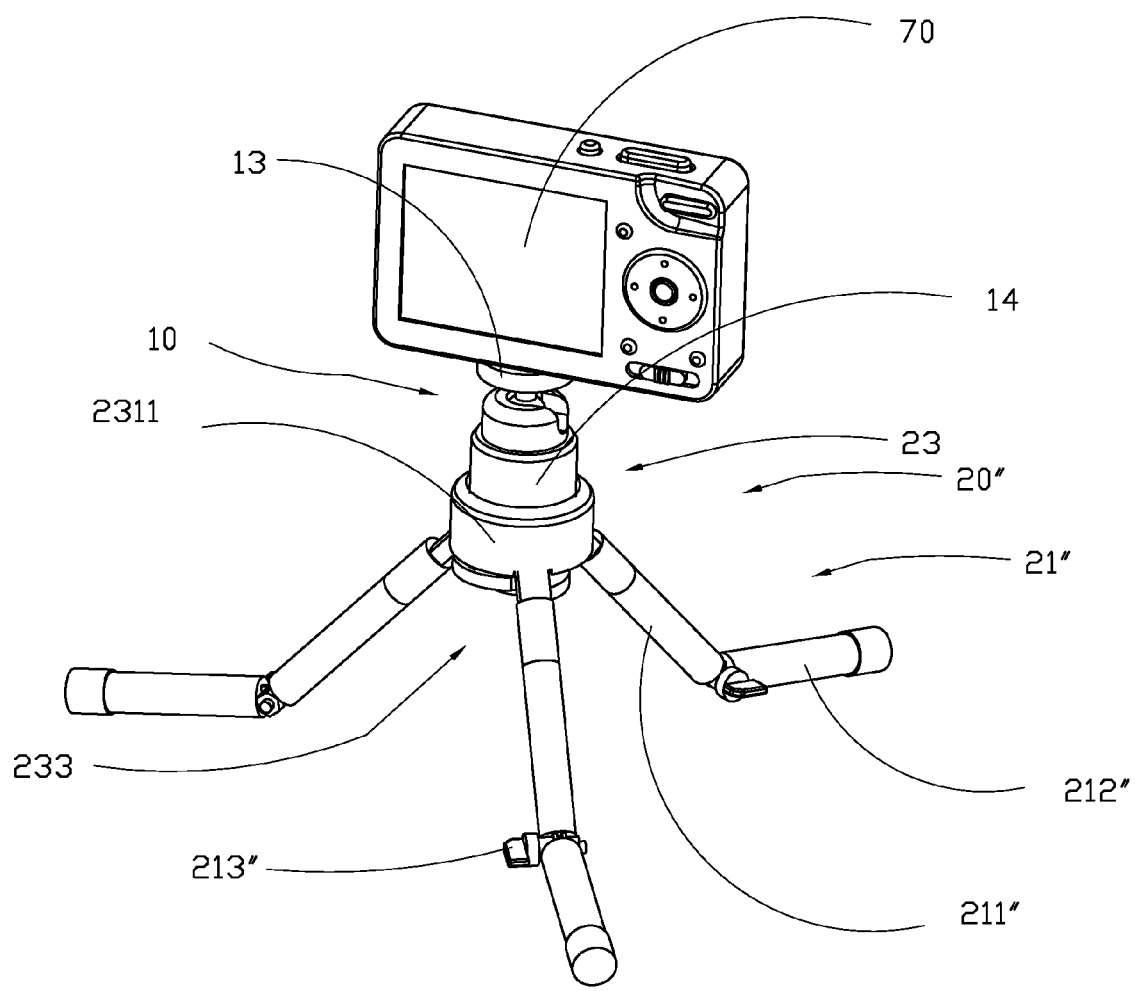
Figure 6G:
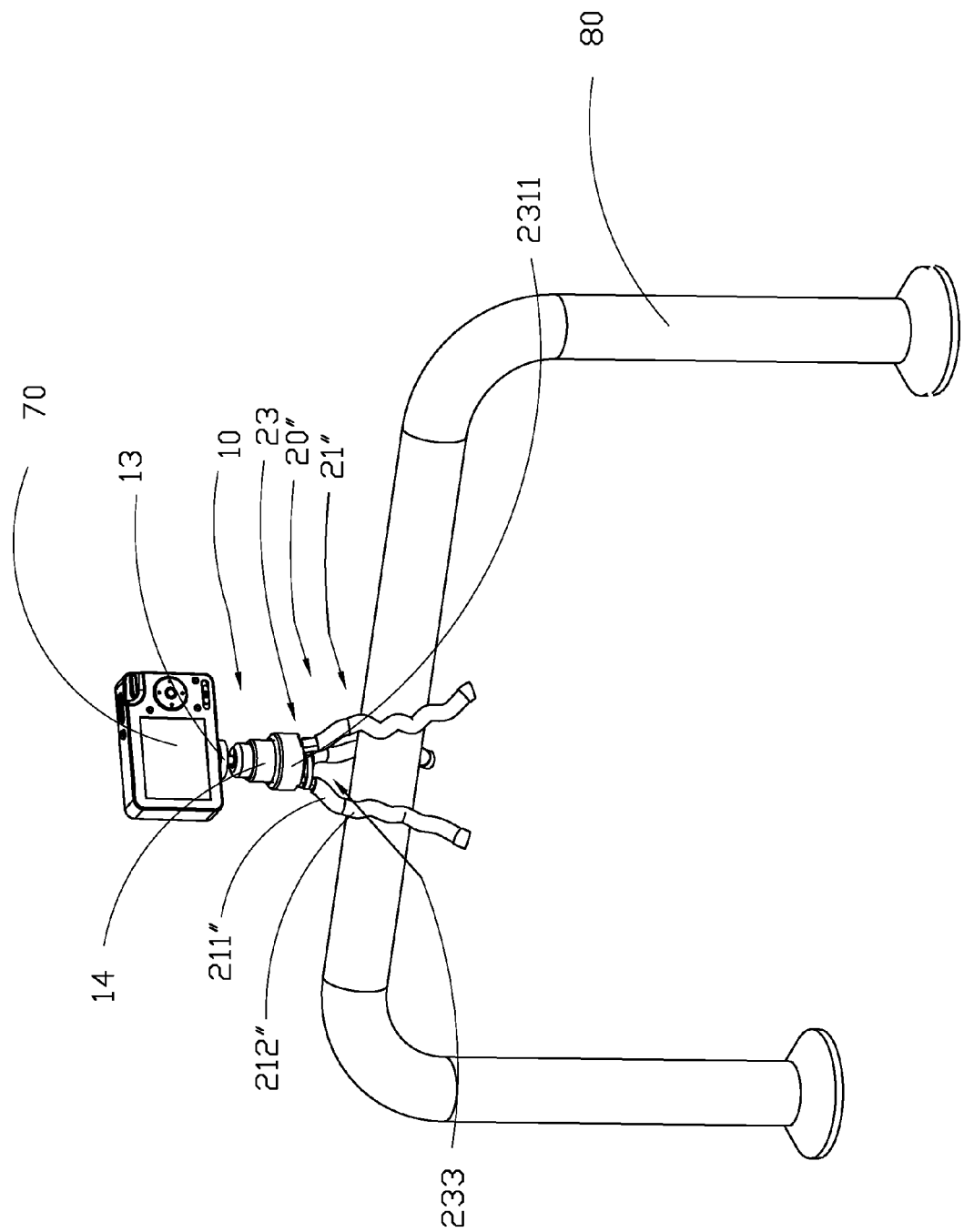

It is worth mentioning that each of the supporting legs 21" can be designed and crafted to form a wide variety of cross sectional shapes so as to meet the diverse circumstances in which the present invention is to be utilized. As shown in FIG. 6A of the drawings, each of the supporting legs 21" is curved outwardly from the support housing 10 for mounting onto an external object 80 wherein the first and the second leg segments 211", 212" are rotatably connected with each other. As shown in FIG. 6B of the drawings, each of the supporting legs 21" has a wavy cross section for substantially resembling the function of the engaging teeth 211 disclosed in the preferred embodiment. As shown in FIG. 6C of the drawings, each of the supporting legs 21" has an inwardly curved section for mounting onto the external object 80, wherein each of the supporting legs 21" has the first and the second leg segments 211", 212" to flexibly forming a desired angle of inclination of the supporting legs 21" with respective to the support housing 10. As shown in FIG. 6D of the drawings, each of the supporting legs 21" is smoothly curved outwardly from the support housing 10 for mounting onto an external object 80. As shown in FIG. 6E and FIG. 6F of the drawings, the first and the second leg segments 211", 212" are pivotally connected with each other for forming a desired cross section for the corresponding supporting leg 21". Referring to FIG. 6G of the drawings, the supporting legs 21" are embodied as having a wavy cross section for mounting onto an external object 80.

Figure 7:
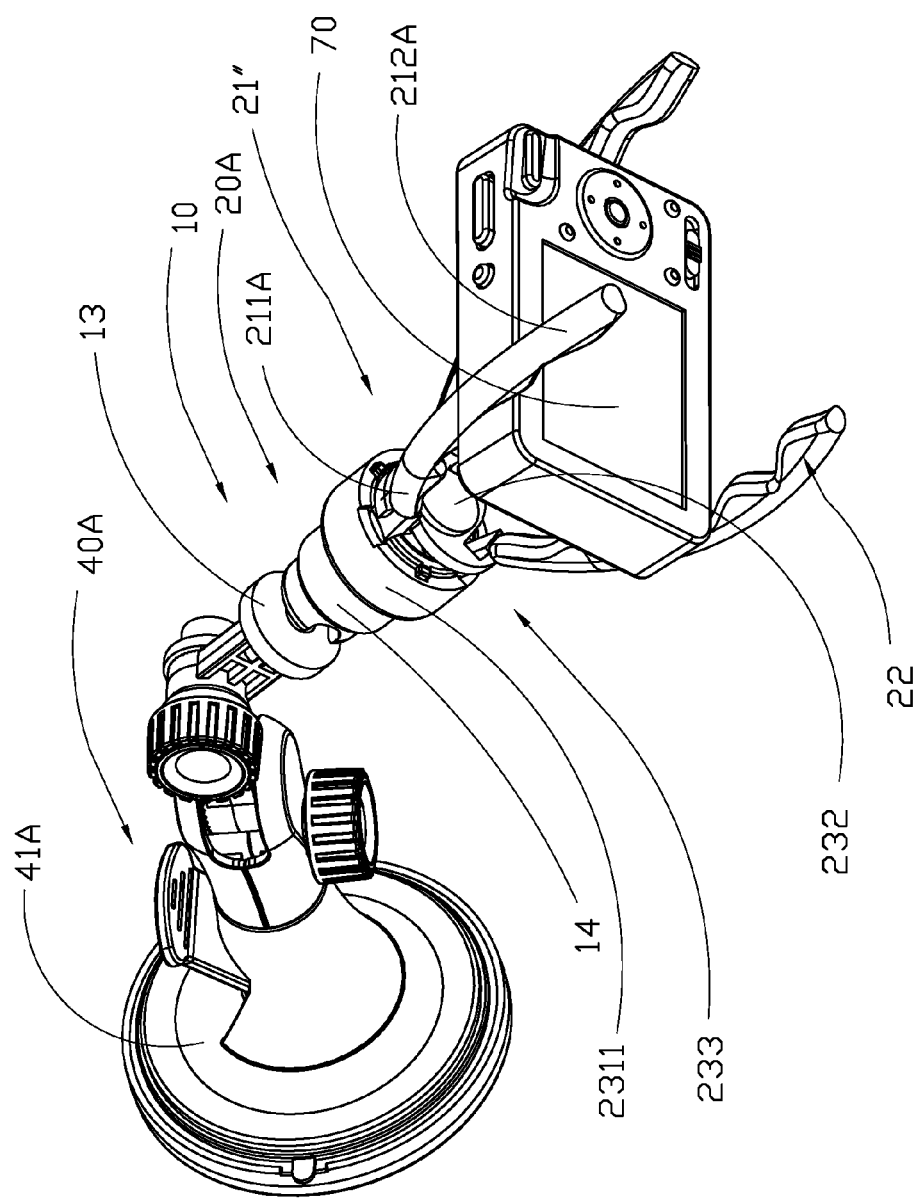
FIG. 7 is a third alternative mode of a portable supporting apparatus according to the preferred embodiment of the present invention.

Referring to FIG. 7 of the drawings, a third alternative mode of the portable supporting apparatus according to the preferred embodiment of the present invention is illustrated. The third alternative mode is similar to the second alternative mode, except the supporting legs 21A, and that the mounting arrangement 20A further comprises a glass mounting unit 40A provided on the support housing 10 for detachably mounting onto a glass surface, such as an inner surface of a windshield of a vehicle. The supporting legs 21A are now therefore adapted for temporarily holding the multimedia device 70 when the portable supporting apparatus is not in use.

Each of the supporting legs 21A comprises at least a first and a second leg segment 211A, 212A movably connected with each other such that each of the first and the second leg segments 211A, 212A is capable of moving with respect to each other. In other words, since each of the supporting legs 21A has a predetermined curved cross section, when either leg segment 211A (212A) moves, the supporting legs 21A are adapted to extend optimally for frictionally biasing against the external object 80 so as to mount the support housing 10 thereonto. Alternatively, the supporting legs 21A are adapted to extend for temporarily holding the multimedia device 70 when the portable supporting apparatus of the present invention is not in use. It is worth mentioning that each of the supporting legs 21A can be designed and crafted to form a wide variety of cross sectional shapes so as to meet the diverse circumstances in which the present invention is to be utilized.

The glass mounting unit 40A comprises an adjustable windshield mount pedestal 41A detachably extended from the support housing 10 for selectively mounting onto an inner glass surface of the windshield so as to (temporarily) mount the support housing 10 and the mounting arrangement 20A onto the windshield, wherein the supporting legs 21A are adapted to securely hold the multimedia device 70.

Figure 8A:
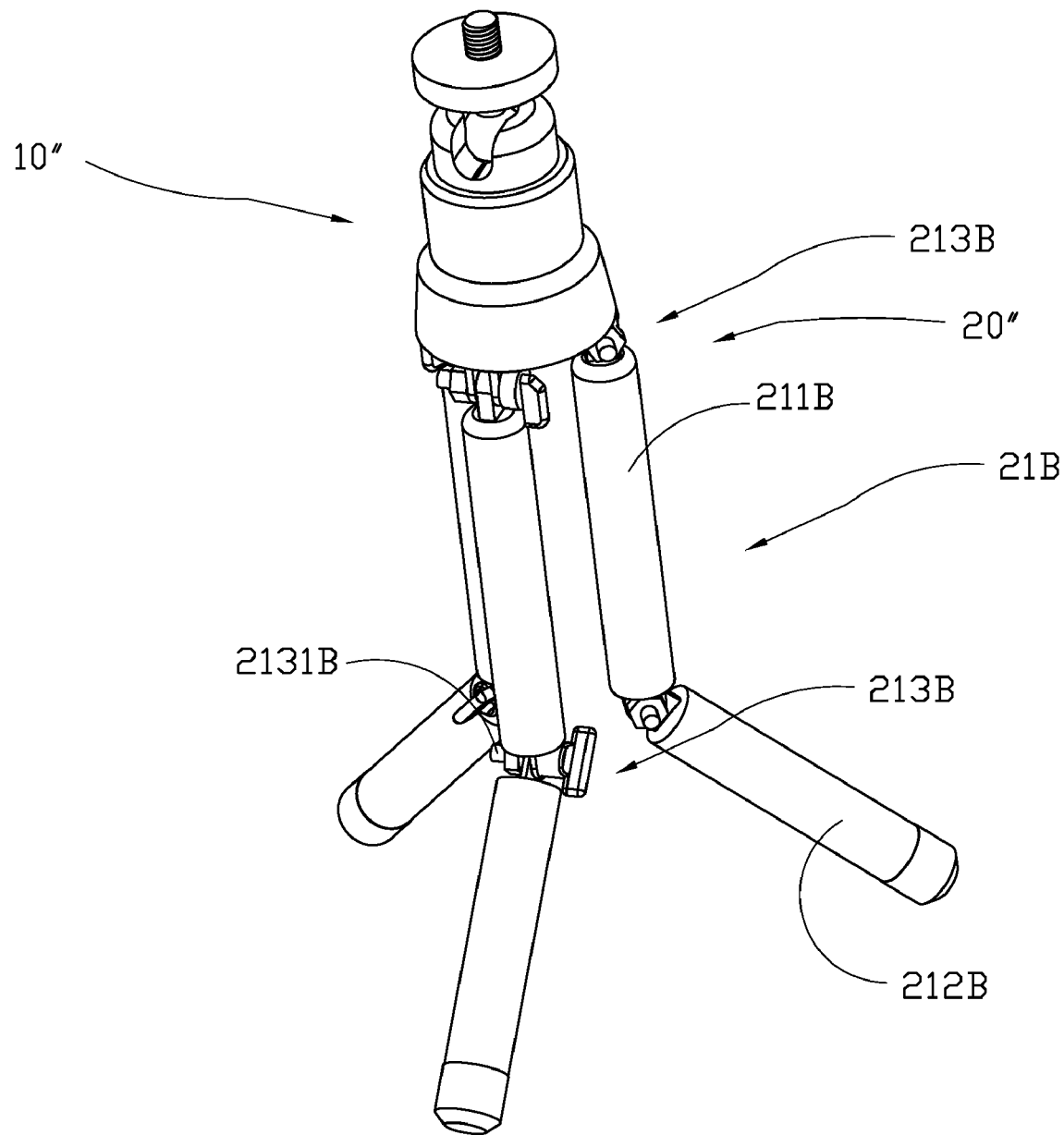
FIG. 8A and FIG. 8B are schematic diagrams of a fourth alternative mode of a portable supporting apparatus according to the preferred embodiment of the present invention.
Figure 8B:
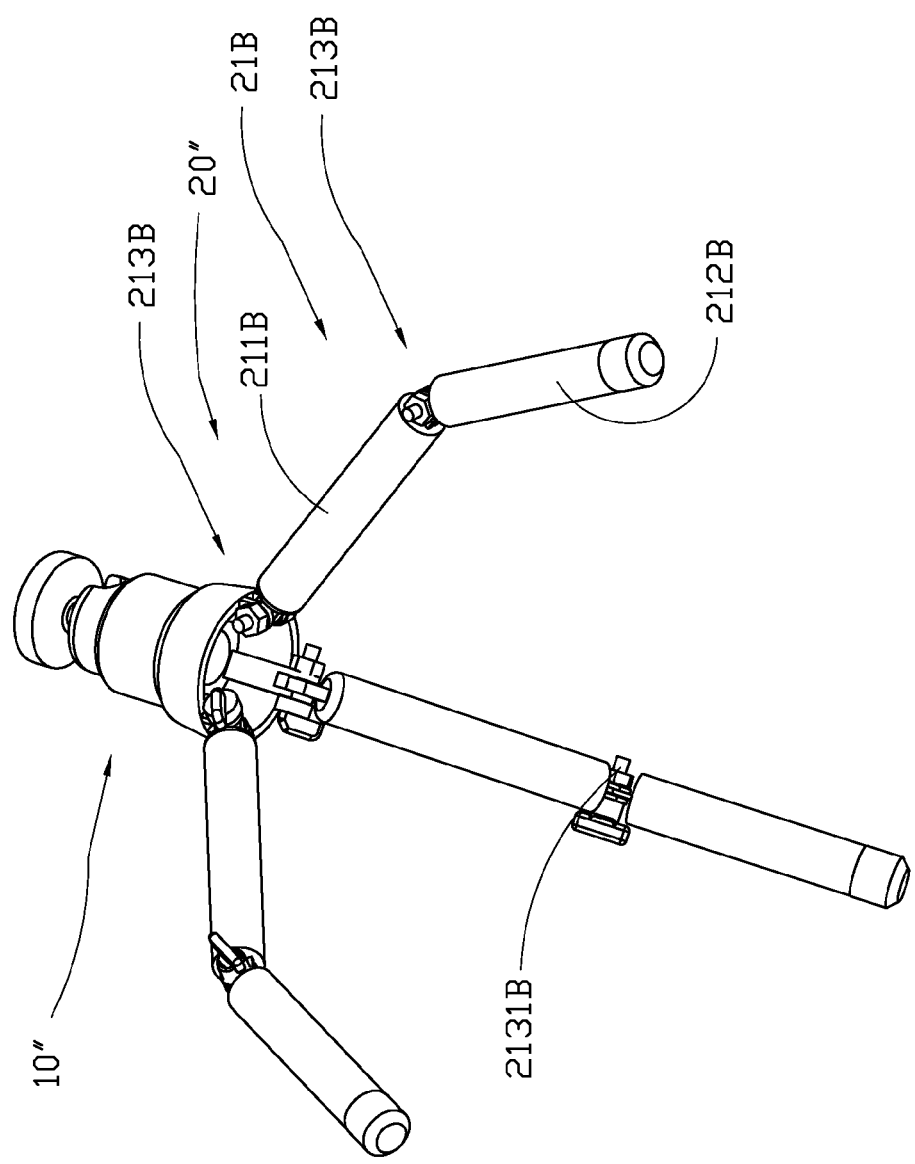

Referring to FIG. 8A to FIG. 8B of the drawings, a fourth alternative mode of the portable supporting apparatus according to the preferred embodiment of the present invention is illustrated. The fourth alternative mode is similar to the second alternative mode described above, except the absence of the securing device 233 and that each of the supporting legs 21B further comprises two leg lockers 213B selectively locking the first leg segment 211B with the support housing 10", and the first leg segment 211B with the second leg segment 212B respectively, in such a manner that each of the first and the second leg segment 211B, 212B is adapted to be locked up at a predetermined position with respect to the supporting housing 10" and the first leg segment 211B respectively.

As a result, the first and the second leg segments 211B, 212B are capable of freely forming a wide range of irregular shapes for mounting the multimedia device 70 onto an even more diverse range of objects. It is worth mentioning that the leg lockers 213B are adapted to retain the irregular shape of the respective supporting leg 21B (i.e. the irregular shape formed by the corresponding first and the second leg segments 211B, 212B). Moreover, each of the supporting legs 21B can be individually locked up by one of the leg lockers 213B for allowing them to mount on the external object.

Each of the leg lockers 213B comprises a locking pin 2131B penetrating the respective first and the second leg segment 211B, 212B for selectively locking the first segment 211B with respective to the supporting housing 10", and the second leg segment 212B with respective to the first leg segment 211B.

In this fourth alternative mode, each of the supporting legs 21B is illustrated not to have the engaging teeth 22. However, one skill in the art would understand that each of the supporting legs 21B in the fourth alternative mode can comprise the engaging teeth 22 for enhancing the mounting performance of the supporting legs 21B.

Figure 9:
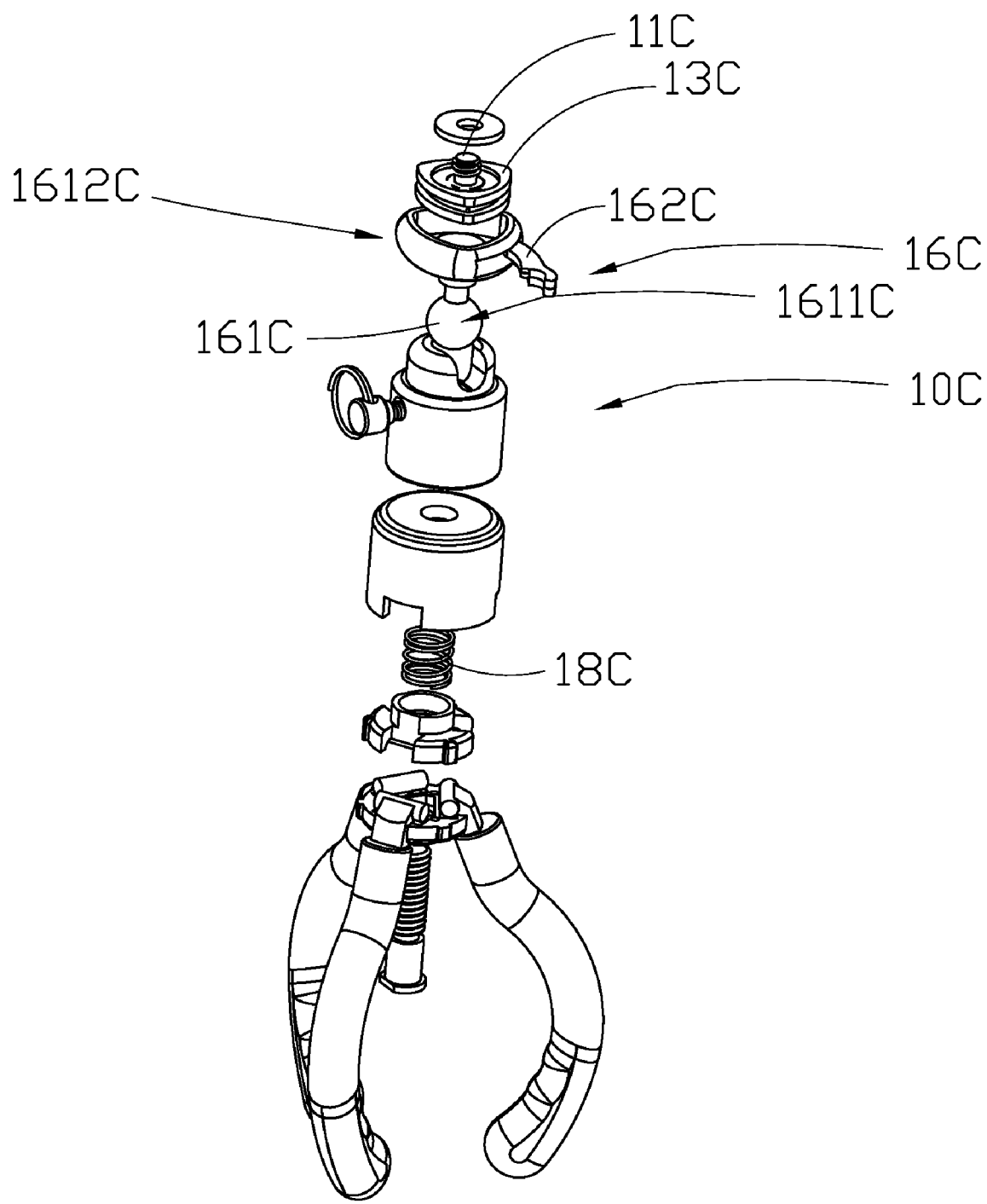
FIG. 9 is a schematic diagram of a fifth alternative mode of a portable supporting apparatus according to the preferred embodiment of the present invention.

Referring to FIG. 9 of the drawings, a fifth alternative mode of the portable supporting apparatus according to the preferred embodiment of the present invention is illustrated. The fifth alternative mode is similar to the second alternative mode described above, except that the main housing 10C further comprises an adjustable joint 16C movably provided on the support housing 10C for adjustably moving the supporting platform 13C and the multimedia connector 11C at a predetermined orientation with respect to the support housing 10C (preferably the connecting joint 14). In other words, the multimedia connector 11C and the supporting platform 13C can be freely rotated so as to adjust the angle of the multimedia device 70 to capture images at that corresponding direction.

More specifically, the adjustable joint 16C comprises a ball joint 161C rotationally mounting the supporting platform 13C and the multimedia connector 11C with the support housing 10C so that the multimedia device 70 can also be rotationally adjustable for facing at a optimal or desirable angle in order to capture a particular object. According to the fifth alternative mode of the present invention, the ball joint 161C has a spherical portion 1611C rotationally mounted on the connecting joint 14C, and a platform seat portion 1612C upwardly extended from the spherical portion 1611C, wherein the supporting platform 13C is mounted on the seat portion 1612C of the ball joint 161C in such a manner that the ball joint 161C is capable of freely rotating about a longitudinal axis of the support housing 10C, as well as pivotally moving with respective to the connecting joint 14C thereof.

Furthermore, the adjustable joint 16C further comprises a platform locker 162C provided on the platform seat portion 1612C of the ball joint 161C for selectively locking the supporting platform 13C on the adjustable joint 161C. It is also worth mentioning that the supporting platform 13C can be detachably attached on the platform seat portion 1612C of the ball joint 161C so that the platform locker 162C provides a quick-release locking mechanism to the supporting platform 13C. It is worth mentioning that the main housing 10C can further comprise a resilient member 18C, such as a compressive spring provided thereon to normally exert an urging force towards the supporting legs 21 so as to downwardly push the supporting legs 21 when they are released from being locked up by the locking device 23. In other words, the resilient element 18C is for assisting quick and smooth unlocking of the supporting legs 21.

One skilled in the art will appreciate that the embodiment of the present invention as shown in the drawings and described above is illustrative only and not intended to be limiting. All embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A portable supporting apparatus for a portable multimedia device, comprising:

a support housing which comprises a multimedia connector for detachably connecting with said portable multimedia device; and a mounting arrangement which is provided underneath said support housing, and comprises a plurality of supporting legs, each having a predetermined shape, pivotally and downwardly extended from said support housing, wherein said supporting legs are adapted to move between an idle position and a mounting position, wherein in said idle position, each of said supporting legs is pivotally and downwardly extended from said support housing for being conveniently transported and stored, wherein in said mounting position, each of said supporting legs is pivotally moved to form a predetermined angle of inclination with respect to said support housing so as to bias against an external object for frictionally retaining a position of said support housing with respect to said external object, such that said portable multimedia device is capable of being securely supported by said external object through said portable supporting apparatus, wherein each of said supporting legs comprises a first leg segment, a second leg segment, and two leg lockers selectively locking said first leg segment with said support housing, and said first leg segment with said second leg segment respectively, in such a manner that each of said first and said second leg segments is adapted to be locked up at a predetermined position by said respective leg locker with respective to said supporting housing and said first leg segment respectively, so that each of said supporting legs are capable of forming a wide variety of shapes for mounting on a diverse range of said external object, wherein each of said leg lockers comprises a locking pin penetrating said respective first and said second leg segment for selectively locking said first segment with respective to said supporting housing, and said second leg segment with respective to said first leg segment.

2. The portable supporting apparatus, as recited in claim 1, wherein said main housing further comprises an adjustable joint movably provided on said support housing for adjustably moving said supporting platform and said multimedia connector at a predetermined orientation with respective to said support housing when said main housing is mounted on said external object.

3. The portable supporting apparatus, as recited in claim 2, wherein said adjustable joint comprises a ball joint rotationally mounting said supporting platform and said multimedia connector with said support housing, wherein said ball joint has a spherical portion rotationally provided on said main housing, and a platform seat portion upwardly extended from said spherical portion, wherein said supporting platform is mounted on said seat portion of said ball joint in such a manner that said ball joint is capable of freely rotating about a longitudinal axis of said support housing, as well as pivotally moving with respective to said main housing.

4. A portable supporting apparatus for a portable multimedia device, comprising:

a support housing which comprises a multimedia connector for detachably connecting with said portable multimedia device; and a mounting arrangement which is provided underneath said support housing, and comprises:

a plurality of supporting legs, each having a predetermined shape, pivotally and downwardly extended from said support housing, wherein said supporting legs are adapted to move between an idle position and a mounting position, wherein in said idle position, each of said supporting legs is pivotally and downwardly extended from said support housing for being conveniently transported and stored, wherein in said mounting position, each of said supporting legs is pivotally moved to form a predetermined angle of inclination with respect to said support housing so as to bias against an external object for frictionally retaining a position of said support housing with respect to said external object, such that said portable multimedia device is capable of being securely supported by said external object through said portable supporting apparatus, wherein each of said supporting legs has a predetermined curved cross-sectional shape along said respective supporting leg extending from said support housing to a lower end portion of said respective supporting leg for optimally clamping onto said external object in a frictional manner; and a plurality of engaging teeth formed along an inner side of said main body portion of each of said supporting legs for substantially enhancing a clamping performance thereof when said supporting legs are pivotally moved to said mounting position, in such a manner that when said supporting legs are pivotally moved to frictionally mount onto said external object, said engaging teeth are adapted for biasing against an outer surface of said external object so as to substantially grip on said external object for mounting said support housing thereon.

5. The portable supporting apparatus, as recited in claim 4, wherein said mounting arrangement further comprises a locking device provided at said support housing to operatively couple with said supporting legs in such a manner that said locking device is adapted to optimally lock up said supporting legs in said mounting position so as to ensure that said supporting legs are locked and retained at a particular position for stably and frictionally mounting onto said external object.

6. The portable supporting apparatus, as recited in claim 5, wherein said locking device comprises a lock member operatively provided underneath said supporting platform of said support housing for selectively locking said supporting legs in position, and a lock adjuster operatively supported by said support housing to mechanically communicate with said lock member for selectively activating said lock member to lock up said supporting legs in position.

7. The portable supporting apparatus, as recited in claim 6, wherein said mounting arrangement further comprises a plurality of frictional member fittedly embedded around each of said supporting legs so as to provide adequate frictional force for mounting said supporting legs onto said external object when said supporting legs are at said mounting position.

8. The portable supporting apparatus, as recited in claim 5, wherein herein said main housing further comprises an adjustable joint movably provided on said support housing for adjustably moving said supporting platform and said multimedia connector at a predetermined orientation with respective to said support housing when said main housing is mounted on said external object.

9. The portable supporting apparatus, as recited in claim 8, wherein said adjustable joint comprises a ball joint rotationally mounting said supporting platform and said multimedia connector with said support housing, wherein said ball joint has a spherical portion rotationally provided on said main housing, and a platform seat portion upwardly extended from said spherical portion, wherein said supporting platform is mounted on said seat portion of said ball joint in such a manner that said ball joint is capable of freely rotating about a longitudinal axis of said support housing, as well as pivotally moving with respective to said main housing.

10. The portable supporting apparatus, as recited in claim 9, wherein said locking device comprises a lock member operatively provided underneath said supporting platform of said support housing for selectively locking said supporting legs in position, and a lock adjuster operatively supported by said support housing to mechanically communicate with said lock member for selectively activating said lock member to lock up said supporting legs in position.

11. The portable supporting apparatus, as recited in claim 10, wherein said mounting arrangement further comprises a plurality of frictional member fittedly embedded around each of said supporting legs so as to provide adequate frictional force for mounting said supporting legs onto said external object when said supporting legs are at said mounting position.

12. The portable supporting apparatus, as recited in claim 11, wherein each of said supporting legs comprises at least a first and a second leg segment rotatably connected with each other such that each of said first and said second leg segments is capable of freely rotating with respect to each other for optimally extending to frictionally bias against said external object at an optimal angle.

13. The portable supporting apparatus, as recited in claim 12, wherein said mounting arrangement further comprises a glass mounting unit comprising an adjustable windshield mount pedestal detachably extended from said support housing for selectively mounting onto a glass surface so as to selectively mount said support housing and said mounting arrangement onto said glass surface while said supporting legs are adapted to securely hold said multimedia device when said portable supporting apparatus is not in use.

14. The portable supporting apparatus, as recited in claim 4, wherein each of said supporting legs comprises at least a first and a second leg segment rotatably connected with each other such that each of said first and said second leg segments is capable of freely rotating with respect to each other for optimally extending to frictionally bias against said external object at an optimal angle.

15. The portable supporting apparatus, as recited in claim 14, wherein said mounting arrangement further comprises a glass mounting unit comprising an adjustable windshield mount pedestal detachably extended from said support housing for selectively mounting onto a glass surface so as to selectively mount said support housing and said mounting arrangement onto said glass surface while said supporting legs are adapted to securely hold said multimedia device when said portable supporting apparatus is not in use.

16. The portable supporting apparatus, as recited in claim 10, wherein each of said supporting legs comprises at least a first and a second leg segment rotatably connected with each other such that each of said first and said second leg segments is capable of freely rotating with respect to each other for optimally extending to frictionally bias against said external object at an optimal angle.

17. The portable supporting apparatus, as recited in claim 16, wherein said mounting arrangement further comprises a glass mounting unit comprising an adjustable windshield mount pedestal detachably extended from said support housing for selectively mounting onto a glass surface so as to selectively mount said support housing and said mounting arrangement onto said glass surface while said supporting legs are adapted to securely hold said multimedia device when said portable supporting apparatus is not in use.

* * * * *